(12) United States Patent
Beyer

(10) Patent No.: US 6,322,737 B1
(45) Date of Patent: Nov. 27, 2001

(54) STRUCTURAL MEMBER AND STRUCTURE CONTAINING THE SAME

(76) Inventor: Curtis D. Beyer, 1802 W. Tangerine, Tucson, AZ (US) 85737

(*) Notice: Subject to any disclaimer, the term of this patent is extended or adjusted under 35 U.S.C. 154(b) by 0 days.

(21) Appl. No.: 09/277,314

(22) Filed: Mar. 26, 1999

(51) Int. Cl.⁷ .................................................. B29C 43/02
(52) U.S. Cl. ........................................... 264/122; 264/109
(58) Field of Search ................................... 264/122, 109

(56) References Cited

U.S. PATENT DOCUMENTS

| | | | |
|---|---|---|---|
| 4,301,198 | 11/1981 | Prior | 428/2 |
| 4,947,611 | 8/1990 | Otsuka | 52/590 |
| 5,177,924 | 1/1993 | Kakuk | 52/606 |
| 5,241,795 | 9/1993 | Giroux et al. | 52/DIG. 9 |
| 5,367,844 | 11/1994 | Diedrich | 52/239 |
| 5,482,550 | 1/1996 | Strait | 106/677 |
| 5,635,125 * | 6/1997 | Ternes et al. | 264/122 |
| 5,724,783 | 3/1998 | Mandish | 52/745.05 |
| 5,729,936 | 3/1998 | Maxwell | 52/220.2 |
| 5,755,836 | 5/1998 | Beyer | 44/535 |
| 5,939,209 * | 8/1999 | Shibuya et al. | 264/122 |
| 6,066,278 * | 5/2000 | Got et al. | 264/122 |

* cited by examiner

Primary Examiner—Mary Lynn Theisen
(74) Attorney, Agent, or Firm—Antonio R. Durando; Durando Birdwell & Janke

(57) ABSTRACT

A structural member consists of agglomerated wood chips, polyethylene/polypropylene material, and a fire retardant. The polyethylene/polypropylene material acts as a binder for the wood chips. The structural member is produced by combining wood chips, polyethylene/polypropylene chips and a fire retardant in a mixer; mixing to produce a substantially uniform aggregate; heating to a temperature below the melting point of the polyethylene/polypropylene material; and pressing the hot mixture in a press to form a structural member of predetermined shape.

18 Claims, 3 Drawing Sheets

STRUCTURAL MEMBER AND STRUCTURE CONTAINING THE SAME

BACKGROUND OF THE INVENTION

1. Field of the Invention

The invention relates to a structural member and to a structure made with the structural member.

2. Description of the Prior Art

In recent years, much effort has been directed to the development of environmentally friendly structural products. Such structural products contain significant percentages of regenerable and/or recycled materials.

A structural product containing a substantial percentage of regenerable material is taught in U.S. Pat. No. 4,947,611. This patent discloses a wall panel containing clay in combination with straw, chaff and palm material. The panel may optionally include hemp.

U.S. Pat. No. 5,177,924 illustrates a structural product which can comprise straw, chaff and/or rice husks. The product further comprises mineral additives as well as cement, lime and/or gypsum.

A box-like structural product with an interior core of sawdust, rubber or waste fiberglass is shown in U.S. Pat. No. 4,301,198. The box-like product has a rigid exterior skin made of a reinforced plastic binder such as fiber-reinforced polyester, epoxy or polyurethane. The binder penetrates the box-like product to contact the core in adhesive relationship.

U.S. Pat. No. 5,241,795 teaches a structural product made from paper sludge, repulped waste paper or virgin paper pulp. This material is mixed with clay or portland cement, or with animal protein adhesives, or with manufactured resins or polymers.

A panel made up of slats composed of recycled pultrusion polyolefin high density polyethylene is disclosed in U.S. Pat. No. 5,367,844. Each slat contains 85 percent or more of the recycled material.

U.S. Pat. No. 5,482,550 discloses a structural product consisting of portland cement, recycled and ground expanded cellular polystyrene, ground cellulosic fiber, fly ash, silica fume, bentonite, water, air entrainer, paraffin wax emulsion and rubber emulsion. The product serves as a roofing material.

A wall panel made up of layers each of which contains a different recycled material is taught in U.S. Pat. No. 5,724,783. The recycled materials in the panel include used fiberglass insulation, recycled polystyrene, rubber tires and old carpets.

The recycled materials are broken down and then mixed with portland cement, microsilica, sand and water before being placed in the panel.

U.S. Pat. No. 5,729,936 teaches the production of a prefabricated panel by compressing a fiber slurry composed of waste paper, waste cardboard, straw, leaves and grass clippings. The slurry, which may contain waterproofing agents, fire retardants, antifungal agents and insecticides, is poured into a press form for compression, As seen from the preceding overview of the prior art, the use of recycled thermoplastic plastics in structural products is limited. Thermoplastic plastics are those which soften or fuse when heated and which harden and become rigid when cooled. Plastics of this type are in contrast to thermosetting plastics which become permanently hard and rigid when heated or cured and which are thereafter relatively incapable of softening or fusing upon heating.

Although the use of recycled thermoplastic plastics in structural products is limited, items made of such plastics constitute one of the largest sources of raw material from recycled matter. A plastic number coding is utilized to separate categories of plastic according to their chemical composition properties, and recyclability, A large number of recycled plastic items (milk and water jugs, detergent bottles, margarine tubs, bags and yogurt containers) are composed of high and low density polyethylene classified with Codes 2 and 4. Similarly, many items (prescription bottles and plastic lids) consist of polypropylene classified with Code 5.

Accordingly, there is still a need for new ways of utilizing recycled thermoplastic plastics. This disclosure is directed to the utilization of such plastic matter as a major component of structural products.

SUMMARY OF THE INVENTION

One objective of this invention is a method of making structural members and structures utilizing large quantities of recycled thermoplastic plastic.

Another goal of the invention is a method of manufacture of structural members and structures that is primarily based on the utilization of recycled material.

Still another goal is a method with low energy requirements based on conventional steps and directed at producing strong structural members.

A further objective is a method that can be implemented easily and economically with commercially available materials and manufacturing equipment, modified only to the extent necessary to fit the requirements of the invention.

The preceding objectives and goals, as well as others which will become apparent as the description proceeds, are achieved by the invention.

One aspect of the invention resides in a method of making a structural member. The method comprises the steps of mixing plant-fiber particles, particles of thermoplastic plastic and a fire retardant to form a mixture, and heating the particles and the fire retardant before or after the mixture is formed. Each of the particles is heated to a temperature below a flash point thereof. The plant-fiber particles have voids, and the method further comprises the step of pressing the mixture while hot as required to cause penetration of the plastic into the voids.

By employing thermoplastic plastic, the particles of plastic can be softened during the heating step. This, in turn, makes it possible for the plastic to penetrate the voids of the plant-fiber particles during the pressing step. Such penetration allows the plastic to form a strong bond with the plant-fiber particles thereby imparting strength to the structural member. Additional strength is derived from the tendency of the fibers of the plant-fiber particles to orient themselves in a crisscross pattern.

The plastic utilized in making the structural member may include polyethylene and/or polypropylene while the plant-fiber particles may comprise nutshells, fruit pits, grain, straw, grass and particles of wood. The plant-fiber particles can constitute 50 to 90 weight percent of the mixture while the plastic can constitute 10 to 50 weight percent of the mixture. It is preferred that the plant-fiber particles be sized to pass through a 50 mm screen and that the plastic particles be sized to pass through a 5 mm screen.

The plant-fiber particles, plastic particles and fire retardant can be heated to a temperature between 120 and 230 degrees Centigrade (about 250 to 450° F.). The mixture is advantageously pressed at a pressure between 70 and 250 kilograms per square centimeter (about 1,000 to 3,500 psi).

Another aspect of the invention resides in a construction method. The construction method comprises the steps of producing a structural member, and erecting a structure using the structural member. The producing step involves (a) mixing particles of thermoplastic plastic and plant-fiber particles having voids to form a mixture, (b) heating the particles before or after the mixture is formed, and (c) pressing the mixture while hot. Each of the particles is heated to a temperature below a flash point thereof, and the mixture is pressed as required to cause penetration of the plastic into the voids of the plant-fiber particles.

An additional aspect of the invention resides in a structural member. The structural member comprises a mass which contains plant-fiber particles, thermoplastic plastic and a fire retardant. The plant-fiber particles have voids, and the plastic penetrates the voids and forms a binder for the plant-fiber particles.

A further aspect of the invention resides in a structure. The structure has at least one structural member which comprises a mass containing plant-fiber particles and thermoplastic plastic. The plant-fiber particles have voids, and the plastic penetrates the voids and forms a binder for the plant-fiber particles.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose but one of the various ways in which the invention may be practiced.

DESCRIPTION OF THE PREFERRED EMBODIMENTS

This invention is based on the discovery that thermoplastic plastic uniformly mixed and bonded to plant-fiber particles produces a composite product of high strength. Contrary to my expectation based on the common perception that composites exhibit relatively poor adhesion, I discovered that the method and composition of the invention produce strong structural members that enable the commercial production of structural members from recycled thermoplastic plastics such as polyethylene and polypropylene. Based on these results, I developed structural products that can be readily produced entirely from waste materials that have limited other use.

For simplicity, the disclosure below is often presented in terms of polyethylene and/or polypropylene, but it is understood to be applicable to other thermoplastic plastics also. Furthermore, the disclosure applies to a single type of plastic as well as a mixture of two or more types of plastic. The disclosed process temperature ranges were determined to apply to both polyethylene and polypropylene and to mixtures of the two. It is noted that various types of thermoplastic plastics are available in numerous forms with different melting points and other physical characteristics.

Similarly to the composition disclosed in my U.S. Pat. No. 5,755,836, plant-fiber material and polyethylene/polypropylene are two components critical to the composition of the present invention. In contrast, the composition of the present invention does not require cement, plaster or the like. Sources of plant fiber can be wood from agricultural waste, byproducts from lumber mills and other manufacturing operations as well as nutshells, fruit pits, grain, straw, and grass. In general, the plant fiber is preferably recycled from waste and byproduct sources. Although this disclosure for the most part refers to wood, it is understood that all such references are intended to include all go waste and byproduct materials that contain plant fiber. Other fibrous materials such as from discarded carpets, some of which may also be thermoplastic, can be used in addition to the plant fiber.

Figure 1:
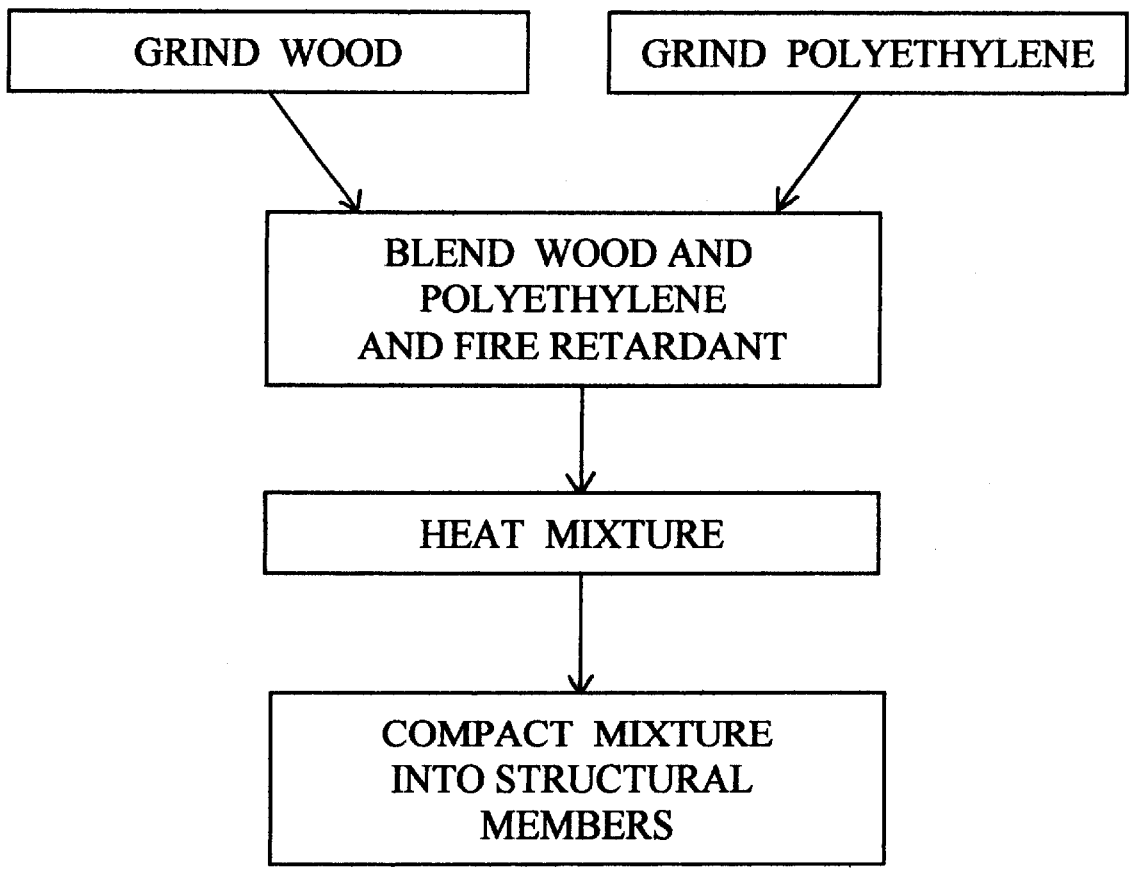
FIG. 1 is a schematic representation of the steps involved in one embodiment of the method of the invention.

As illustrated schematically in FIG. 1, the method of the invention involves a step of reducing the wood or other plant fiber to chips having a mean particle size of 1 to 50 mm in diameter (that is, they pass through a 50-mm screen). A mean particle size of 20 to 25 mm in diameter is preferred. It is noted that smaller and larger particles, such as sawdust and wood chunks, are suitable for the invention. I found that a conventional grinder such as the Maxigrind 425G manufactured by Rexworks of Milwaukee, Wis., is suitable for grinding any mixture of plant-fiber materials to the desired size.

The recycled polyethylene/polypropylene material is similarly reduced to chips or shavings sufficiently small to allow its rapid blending with the wood material to produce a substantially uniform aggregate. A granulator such as marketed by Polymer Systems Inc. of Berlin, Conn., as Model 68-912-1116-1120, is suitable for reducing the polyethylene/polypropylene material to an acceptable size. The idea is to use small enough particles to distribute the polyethylene/polypropylene material in the mixture so as to have great surface contact with the wood particles and maximize the bonding strength of the aggregate. Particles ground to about 1–5 m in effective diameter (that is, ground to pass through a 1- to 5-mm screen) are optimal for mixing. The ground wood and polyethylene/polypropylene particles are mixed in conventional equipment, such as plaster or cement mixers, to yield a uniformly distributed mixture. A fire retardant and a termiticide may also be mixed with the ground wood and polyethylene/polypropylene particles.

The uniform blend of wood, polyethylene/polypropylene particles and fire retardant is then heated to a temperature below the flash point of the mixture, which I found to ignite or at least begin smoldering at temperatures below the melting point of the polyethylene (or polypropylene) at atmospheric pressure. The idea of the invention is to form a stable aggregate by forcing the polyethylene/polypropylene into voids in the wood fiber by applying sufficient pressure to fluidize the polyethylene/polypropylene at a temperature below the flash point of the mixture. Thus, the exact temperature depends on the operating pressure and the exact composition of the mixture. At about 215 kilograms per square centimeter, a temperature between 150 degrees Centigrade and 200 degrees Centigrade (an average temperature at which such mixtures begin smoldering at that pressure) is typically safe for any wood-source and polyethylene blend. A temperature of about 160 degrees Centigrade is preferred. The heating operation is continued until all plastic material has reached the desired temperature and begun to bond to the surfaces of the wood particles. This step of the operation can be carried out in a standard heated mixer or any arrangement suitable for preparing the mixture for further processing in a press. For example, I heated the mixture with a hot-air blower while the mixture was being transported on a conveyor to an auger feeding the press. I found that a mixture based on 10 to 50 percent by weight of polyethylene/polypropylene (and, correspondingly, on 50 to 90 weight percent of wood) produces a structurally solid composite without the use of any binders. This is an advantage of the present invention with respect to prior-art compositions.

In an alternative method for mixing the wood with the fire retardant and the polyethylene/polypropylene material (particularly suitable for polyethylene film), the wood particles are heated separately in the mixer, such as by a hot air flow, and then combined in the mixer with the fire retardant and fluidized polyethylene. This approach is particularly appropriate with low density polyethylene (recycle Code 4) because that material, being mostly in the form of thin films, is difficult to grind into discrete particles. In addition, the lower melting point and ductility of low density polyethylene makes it possible to stretch it and blend it even at atmospheric pressure within the temperature range of operation of the invention. The separately-heated materials are thus mixed thoroughly to produce a uniform blend suitable for compaction. Typically, a mixing time of a few minutes is adequate to fully blend the two components. This approach is illustrated in the diagram of FIG. 2.

Figure 2:
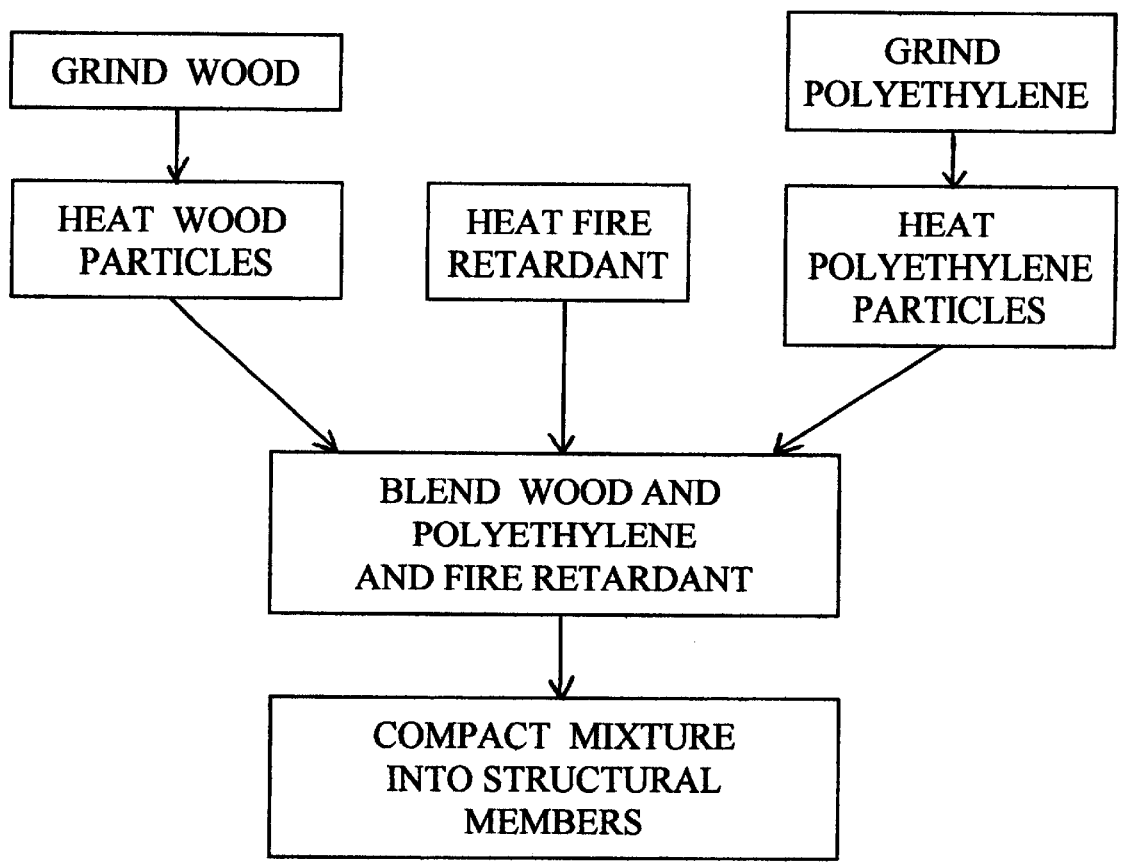
FIG. 2 is a schematic representation of the steps involved in another embodiment of the method of the invention.

If heavier polyethylenes or polypropylenes are used, the step of heating the plastic particles in the process of FIG. 2 can advantageously be carried out in an extruder under pressure where the relative absence of air in the extruder makes it possible to heat the plastic material to temperatures as high as 230 degrees Centigrade without flashing. The balance of the process is then carried out by blending the extruded plastic and the heated wood as described above.

The hot mixture so obtained is then processed in a conventional press to concretely bond the particles of the mixture and, at the same time, to produce structural members. This compaction step is carried out at a pressure of about 1,000 to 3,500 pounds per square inch (about 70 to 250 kilograms per square centimeter). At these high pressures, the hot polyethylene/polypropylene is partially fluidized and forced to permeate or penetrate into voids in the wood fibers. The high level of compaction (typically the volume of the aggregate is halved in the press) produces a uniformly bonded composite that requires no other binding agent. The exact compaction pressure is selected with a view to producing a concrete and stable aggregate. For a mixture containing about 83 weight percent wood fiber, a pressure of about 3,000 psi (approximately 215 kilograms per square centimeter) is optimal.

The following examples illustrate the production of structural members in accordance with the invention.

EXAMPLE 1

A batch of about 145 pounds of scrap wood pieces was ground into particles smaller than 25 mm while a batch of about 30 pounds of recycled polyethylene (mostly from water and milk bottles) was ground into particles smaller than 5 mm. The two batches (83 weight percent wood, 17 weight percent polyethylene), together with a fire retardant, were mixed in a plaster mixer for about one minute to produce a substantially uniform blend. The composite mixture was then heated to approximately 160 degrees Centigrade with hot air and fed to a press through an auger. The press was operated at approximately 215 kilograms per square centimeter to form a structural member.

EXAMPLE 2

A 135-lb batch of a mixture of scrap wood pieces and nutshells (60 percent wood/40 percent nutshell weight ratio) was ground into particles smaller than 25 mm while a 30-lb batch of recycled polyethylene (mostly from water and milk bottles) was ground into particles smaller than 5 mm. The two batches (81 weight percent wood/nutshell, 19 weight percent polyethylene), together with a fire retardant, were mixed in a plaster mixer for about one minute to produce a substantially uniform blend. The composite mixture was then heated to approximately 160 degrees Centigrade with hot air and fed to a press through an auger. The press was operated at approximately 230 kilograms per square centimeter to form a structural member.

EXAMPLE 3

About 135 lbs of sawdust were mixed with a 30-lb batch of recycled polyethylene particles (mostly from water and milk bottles) smaller than 5 mm. The two batches (82 weight percent sawdust, 18 weight percent polyethylene), together with a fire retardant, were mixed in a plaster mixer for about one minute to produce a substantially uniform blend. The composite mixture was then heated to approximately 160 degrees Centigrade with hot air and fed to a press through an auger. The press was operated at approximately 230 kilograms per square centimeter to form a structural member.

Figure 3:
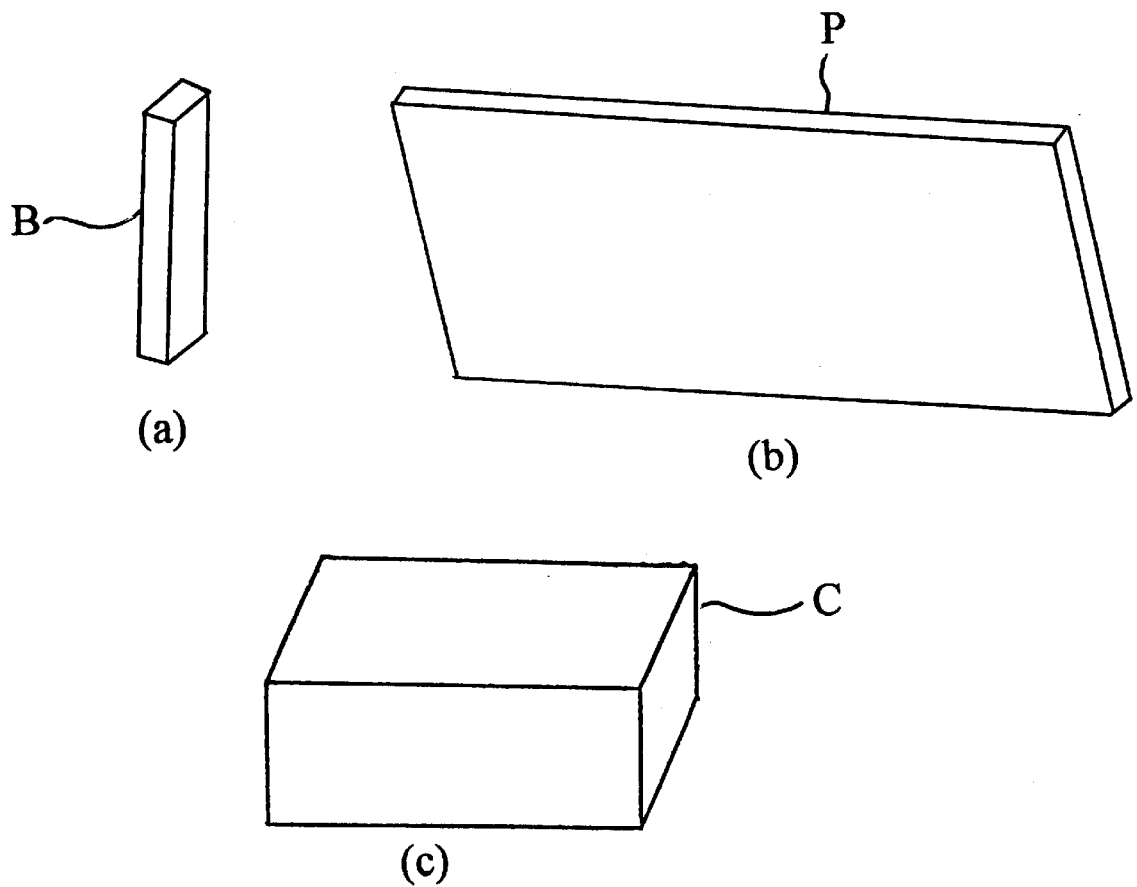
FIGS. 3a, 3b and 3c are perspective views of structural members in accordance with the invention.

FIGS. 3a, 3b and 3c illustrate three examples of structural products which can be made in accordance with the invention. A structural product in the form of a board, e.g. a 2×4, is shown in FIG. 3a and is denoted by B while a structural product in the form of a panel is shown in FIG. 3b and is denoted by P. FIG. 3c illustrates a structural product which is configured as a construction block and is identified by C.

Figure 4:
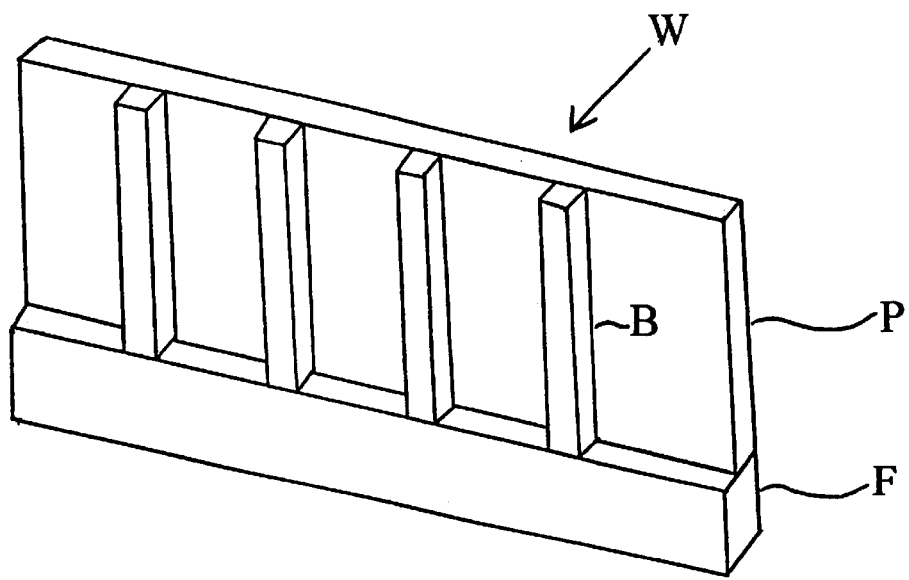
FIG. 4 is a perspective view of a structure in accordance with the invention.

The structural products of the invention can be used to erect structures. For instance, a panel P and several boards B are produced according to the invention and then transported to a construction site. A foundation F illustrated in FIG. 4 is poured and the boards B are anchored to the foundation F in an upright position using conventional techniques. Once the boards B have been secured to the foundation F, the panel P is attached to the boards B in a conventional manner to form a wall W of a structure.

An advantage of this invention is the simplicity of the method through which strong structural members can be manufactured utilizing primarily recycled materials. By applying sufficient pressure to the mixture in the press to achieve partial permeation of the polyethylene/polypropylene material into the wood fiber at safe temperatures (below the flash point of the mixture), no binders or other additives are required to yield an acceptably strong composite.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method of making a structural member comprising the steps of:

mixing plant-fiber particles, particles of thermoplastic plastic and a fire retardant to form a mixture, said plant-fiber particles having voids;

heating said plant-fiber particles, said particles of thermoplastic plastic and said fire retardant before or after said mixture is formed, each of said particles being heated to a temperature below a flash point thereof; and pressing said mixture while hot as required to cause penetration of said plastic into said voids.

2. The method of claim 1, wherein said plastic comprises a member of the group consisting of polyethylene and polypropylene.

3. The method of claim 1, wherein said mixture is pressed at a pressure between approximately 70 and approximately 250 kilograms per square centimeter.

4. The method of claim 1, wherein said plant-fiber particles constitute approximately 50 to approximately 90 weight percent of said mixture and said plastic constitutes approximately 10 to approximately 50 weight percent of said mixture.

5. The method of claim 1, wherein said plant-fiber particles comprise a member of the group consisting of wood, nutshells, fruit pits, grain, straw and grass.

6. The method of claim 1, wherein said plant-fiber particles are sized to pass through a 50 mm screen.

7. The method of claim 1, wherein said plastic particles are sized to pass through a 5 mm screen.

8. The method of claim 1, wherein said particles and said fire retardant are heated to a temperature between approximately 120 and approximately 230 degrees Centigrade.

9. The method of claim 1, wherein said plant-fiber particles comprise a member of the group consisting of wood, nutshells, fruit pits, grain, straw and grass and said plastic comprises a member of the group consisting of polyethylene and polypropylene, said plant-fiber particles being sized to pass through a 50 mm screen, and said plastic particles being sized to pass through a 5 mm screen, said particles and said fire retardant being heated to a temperature between approximately 120 and approximately 230 degrees Centigrade, and said mixture being pressed at a pressure between approximately 70 and approximately 250 kilograms per square centimeter.

10. A construction method comprising the steps of:

producing a structural member, the producing step including (a) mixing particles of thermoplastic plastic and plant-fiber particles having voids to form a mixture, (b) heating said thermoplastic particles and plant-fiber particles before or after said mixture is formed, and (c) pressing said mixture while hot, each of said particles being heated to a temperature below a flash point thereof, and said mixture being pressed as required to cause penetration of said plastic into said voids; and erecting a structure using said structural member.

11. The method of claim 10, wherein said plastic comprises a member of the group consisting of polyethylene and polypropylene.

12. The method of claim 10, wherein said mixture is pressed at a pressure between approximately 70 and approximately 250 kilograms per square centimeter.

13. The method of claim 10, wherein said plant-fiber particles constitute approximately 50 to approximately 90 weight percent of said mixture and said plastic constitutes approximately 10 to approximately 50 weight percent of said mixture.

14. The method of claim 10, wherein said plant-fiber particles comprise a member of the group consisting of wood, nutshells, fruit pits, grain, straw and grass.

15. The method of claim 10, wherein said plant-fiber particles are sized to pass through a 50 mm screen.

16. The method of claim 10, wherein said plastic particles are sized to pass through a 5 mm screen.

17. The method of claim 10, wherein said particles and said fire retardant are heated to a temperature between approximately 120 and approximately 230 degrees Centigrade.

18. The method of claim 10, wherein said plant-fiber particles comprise a member of the group consisting of wood, nutshells, fruit pits, grain, straw and grass and said plastic comprises a member of the group consisting of polyethylene and polypropylene, said plant-fiber particles being sized to pass through a 50 mm screen, and said plastic particles being sized to pass through a 5 mm screen, said particles and said fire retardant being heated to a temperature between approximately 120 and approximately 230 degrees Centigrade, and said mixture being pressed at a pressure between approximately 70 and approximately 250 kilograms per square centimeter.

* * * * *